No. 794,697.

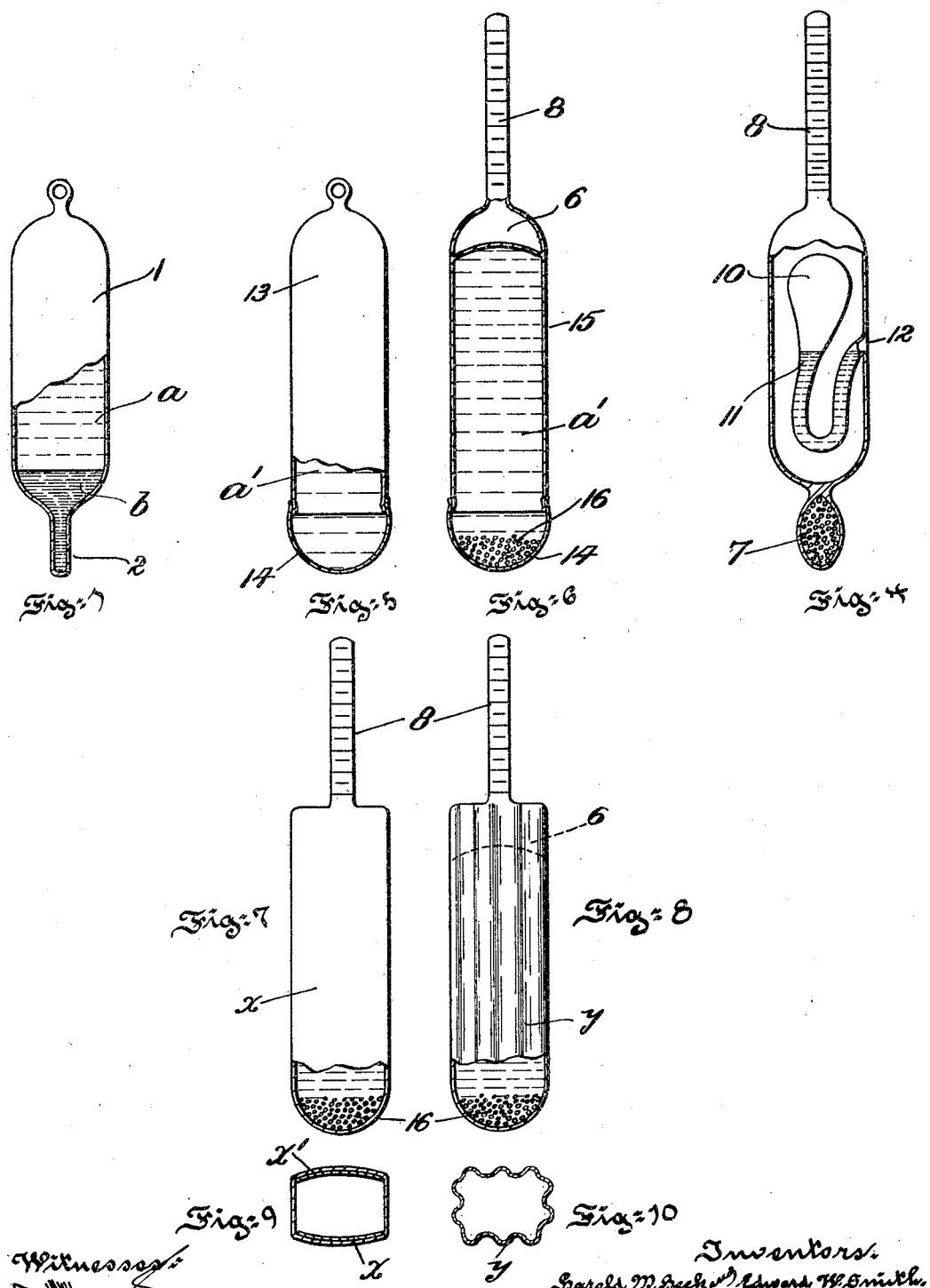

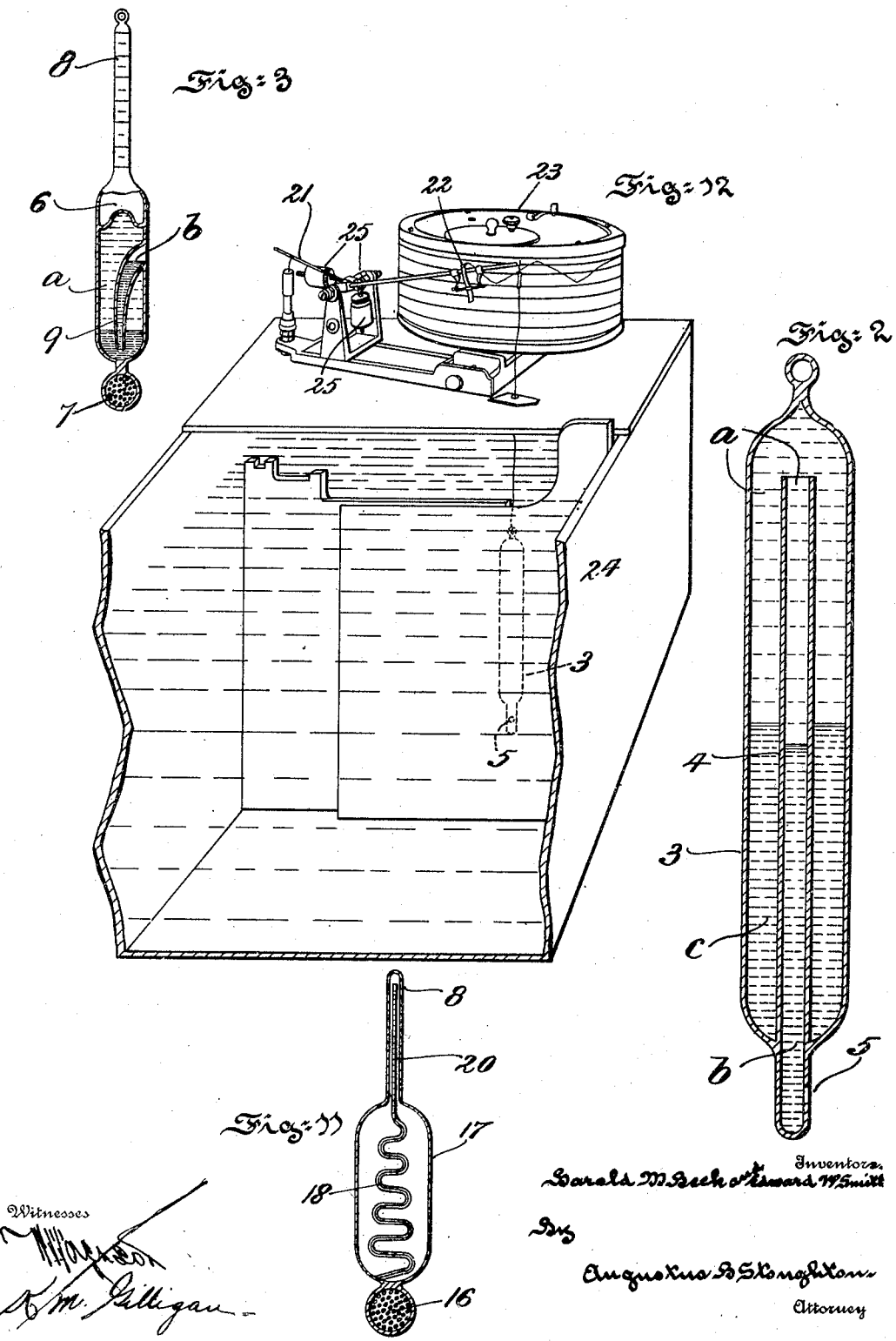

Patented July 11, 1905.

UNITED STATES PATENT OFFICE.

HAROLD M. BECK, OF CHICAGO, ILLINOIS, AND EDWARD W. SMITH, OF PHILADELPHIA, PENNSYLVANIA, ASSIGNORS TO THE ELECTRIC STORAGE BATTERY COMPANY, OF PHILADELPHIA, PENNSYLVANIA, A CORPORATION OF NEW JERSEY.

HYDROMETER.

SPECIFICATION forming part of Letters Patent No. 794,697, dated July 11, 1905.

Application filed June 25, 1904. Serial No. 214,097.

*To all whom it may concern:*

Be it known that we, HAROLD M. BECK, a resident of Chicago, in the county of Cook and State of Illinois, and EDWARD W. SMITH, a resident of Philadelphia, in the county of Philadelphia and State of Pennsylvania, citizens of the United States, have invented a certain new and useful Hydrometer, of which the following is a specification.

One object of the present invention is to provide a hydrometer whose readings shall be constant notwithstanding changing temperature of the fluid of which the density is to be measured.

Another object of the invention is to provide a hydrometer well adapted for measuring the changes in density of the electrolyte of a storage battery which are due to charges and discharges thereof without regard to changes in density due to temperature changes.

Another object of the invention is to obtain a permanent and accurate record of the changes of density of the electrolyte of a storage battery which accompany the charges and discharges thereof during a period of time.

To these and other ends hereinafter set forth the invention, stated in general terms, comprises a hydrometer provided with means for compensating for temperature changes either alone or in combination with a recording apparatus, and the invention further comprises the improvements to be presently described and finally claimed.

In the drawings, Figures 1, 2, 3, and 4 are elevational views, partly in section, of hydrometers embodying features of the invention and in which their volume is constant and their weight varies inversely as the temperature changes. Figs. 5, 6, 7, and 8 are similar views of hydrometers embodying modifications of the invention and in which their weight is constant and their volume is proportional to temperature. Figs. 9 and 10 are sectional views of the hydrometer shown in Figs. 7 and 8. Fig. 11 is a sectional view of a hydrometer embodying another modification of the invention; and Fig. 12 is a perspective view, partly in section, illustrating a recording-hydrometer embodying features of the invention.

Referring to Fig. 1, the vessel 1 is adapted to contain a temperature-compensating substance, and it is fitted or provided with an opening 2 for ingress and egress of a portion of the fluid to be tested.

Referring to Fig. 2, 3 is a vessel adapted to contain a temperature-compensating substance and having a tube 4 adapted to project into and communicate with its interior. 5 is an opening for the ingress and egress of a portion of the fluid to be tested.

The hydrometers shown in Figs. 2 and 1 are arranged to operate as immersed bulbs, and their displacement is constant notwithstanding changes of density of the fluid to be measured.

Referring to Fig. 1, $a$ indicates the temperature-compensating substance, an example of which is oil, and $b$ indicates a portion of the fluid in which the hydrometer is placed and of which the electrolyte of a storage battery is an example. For the sake of explanation it will be assumed that there is a change in temperature in the electrolyte, and there is of course also a corresponding change of temperature in the fluid $a$. The latter, however, contracts or expands and either increases or diminishes the quantity of electrolyte $b$ within the bulb, the aperture 2 serving for this ingress or egress. The effect of this is to change the weight of the hydrometer as a whole so as to cause it to occupy the same position notwithstanding such temperature changes. If the temperature of the electrolyte should rise, it becomes less dense, so that the hydrometer would tend to sink; but the temperature of the fluid $a$ also rises and causes it to expand, thus ejecting some of the acid, so that the weight of the hydrometer diminishes and the hydrometer remains in its original position, correctly indicating the density of the electrolyte at a certain standard temperature without regard to the changes due to changes of temperature. It will therefore be understood that the volume of the hydrometer is constant with changes of temperature and that its weight is inversely proportional to temperature. Such changes in density of the electrolyte as are due to charges and discharges of the battery cause the bulb to correspondingly change its position in the ordinary and well-understood manner.

The operation of the device illustrated in Fig. 2 is substantially the same as has been described with reference to Fig. 1. However, the bulb may contain fluid $c$ as electrolyte upon which the oil or temperature-compensating substance $a$ is floated. In this case the oil serves to prevent diffusion between the electrolyte $c$ and the electrolyte $b$.

As shown in Figs. 3 and 4, the hydrometers are arranged to float, and their displacement is proportional to the density of the electrolyte or other fluid. In Fig. 3 there is an air-chamber 6 and a weight-chamber 7, and the instrument is provided with a graduated stem 8. $a$ is the temperature-compensating fluid, and $b$ a portion of the electrolyte or other fluid. The tube 9 is arranged so as to project downward instead of upward, as in Fig. 2; but the operation of the device will be obvious from the foregoing description of the operation of the hydrometer shown in Fig. 2. The purpose of the air and weight chambers 6 and 7 is to keep the hydrometer in vertical position. As shown in Fig. 4, the internal end of the tube 10 is sealed and constitutes an air-chamber, and the expansion and contraction under temperature changes of the air in the chamber 10 causes the admission or expulsion of electrolyte or other fluid from the tube 11 by way of the opening 12.

In the device shown in Figs. 5, 6, 7, and 8 the weight remains constant; but the volume of the instrument is proportional to temperature changes. As shown in Fig. 5, the vessel 13 is provided with a flexible diaphragm or wall 14, and it contains a suitable temperature-compensating liquid, as $a'$. When the temperature of the electrolyte or other liquid in which the device is immersed increases, its density becomes less, but the fluid $a'$ expands and the volume of the instrument increases, so that it remains stationary, and, conversely, when the temperature of the electrolyte diminishes its density increases and the fluid $a'$ contracts and the volume of the instrument as a whole is reduced, so that it remains at rest. Expansion and contraction of the diaphragm or flexible wall 14 permit of this change of volume. Referring to Fig. 6, the vessel 15 is provided with a stem 8 and may be counterweighted, as by means of shot 16. It is also provided with an air-chamber 6 and is intended to float in upright position. The mode of operation of the device shown in Fig. 6 is the same as has been already described in connection with Fig. 5.

Referring to Figs. 7, 8, 9, and 10, the instruments there shown are provided with a stem and may be counterbalanced by means of shot 16. However, their walls may be described as compound, meaning that they are constructed of one or more metals having different coefficients of expansion, so that when the temperature rises the walls expand and when it falls they contract, thus varying the volume of the instrument which may contain air or suitable fluid. In Figs. 7 and 9 two of the side walls $x$ and $x'$ are shown as compound and convex, and in Figs. 8 and 10 the wall $y$ is corrugated.

Referring to Fig. 11, the vessel 17 is provided with a stem 8, which may not be graduated, and with counterbalancing-shot or the like 16, if the same are necessary for keeping it in upright position. Within the instrument there is a movable graduated scale 20, whose position is made to change with changes in temperature in any well-known manner. For the sake of illustration we have shown this means as consisting of a spring 18, which may be called "compound" in the sense that its length responds to temperature changes and which consists, for example, of metals having different coefficients of expansion. This spring carries the graduated scale 20. In this instrument the weight and volume are constant; but the position of the scale changes as the temperature changes by reason of the action of the spring 18. Thus readings from the scale show the density corrected to a standard temperature.

In Fig. 12 the hydrometer shown, for example, in Fig. 2 is suspended from a properly-balanced pivotal arm 21, fitted with a pencil or stylus 22, operatively arranged in respect to paper or the like upon the rim of the drum 23, which is driven by means of clockwork and may be called a "recording-drum." The mode of operation of this device may be described as follows: The hydrometer provided with means for compensating for temperature is so adjusted that its weight will be slightly in excess of the weight of an equal volume of electrolyte in the cell 24 whose operation is to be recorded. The hydrometer is balanced by weights 25, so as to hang in equilibrium and be completely immersed in the electrolyte of the cell. As the density of the electrolyte changes with the working of the battery its buoying action upon the float will change and the balanced arm will take up a new position of equilibrium corresponding to the change in density, and such motion will be accurately recorded by the stylus upon the recording-drum, and inasmuch as the hydrometer is provided with temperature-compensating means it follows that changes in density of the electrolyte due to changes of its temperature will not affect any movement of the hydrometer or stylus, so that the latter will record only changes in density which are due to charges and discharges of the battery.

It will be obvious to those skilled in the art to which our invention appertains that modifications may be made in detail—for example, in the character of the fluids employed as temperature-compensating substances as well as in the fluids whose density is measured—without departing from the spirit of the invention. Hence we do not limit ourselves to the precise mode of construction and operation herein set forth; but,

Having thus described the nature and objects of our invention, what we claim as new, and desire to secure by Letters Patent, is—

1. A self-contained temperature-compensating hydrometer consisting of a vessel and means wholly supported thereby for automatically compensating for temperature changes, substantially as described.

2. A hydrometer consisting of a vessel provided with means expansive and contractile in response to temperature changes and adapted to change the ratio between its weight and volume in proper degree to compensate for changes in the density of the fluid to be tested, substantially as described.

3. A hydrometer of substantially constant volume provided with means for automatically changing its weight in response to temperature changes, substantially as described.

4. A hydrometer comprising the combination of recording means, a float connected with said means and consisting of a vessel provided with an opening, and a compensating substance for causing the float to take on and throw off portions of the materal in which it is immersed, substantially as described.

5. A hydrometer comprising recording means, a hydrometer vessel operatively connected with said means, and provisions wholly supported by said vessel for compensating for temperature changes, substantially as described.

6. A hydrometer consisting of a vessel adapted to contain a temperature-compensating substance and having an open aperture for ingress and egress of a portion of the fluid in which the hydrometer is immersed, substantially as described.

7. A hydrometer consisting of a vessel adapted to contain a temperature-compensating substance and having a tube projecting into and communicating with its interior, and said tube having an opening for ingress and egress of a portion of the fluid to be tested, substantially as described.

8. In combination a hydrometer consisting of a closed vessel adapted to contain a temperature-compensating substance and having an open aperture for ingress and egress of a portion of the fluid in which the hydrometer is immersed, and recording means operatively connected with said hydrometer, substantially as described.

9. In combination a hydrometer consisting of a vessel adapted to contain a temperature-compensating substance and having a tube projecting into and communicating with its interior, and said tube having an opening for ingress and egress of a portion of the fluid to be tested, and recording means operatively arranged in respect to the hydrometer, substantially as described.

In testimony whereof we have hereunto signed our names.

HAROLD M. BECK.
EDWARD W. SMITH.

Witnesses:
  BRUCE FORD,
  GEO. M. HOWARD.